United States Patent [19]

Iritani et al.

[11] Patent Number: 5,355,690
[45] Date of Patent: Oct. 18, 1994

[54] AIR CONDITIONING APPARATUS

[75] Inventors: Kunio Iritani, Anjo; Akira Isaji, Nishio, both of Japan

[73] Assignee: Nippondenso Co., Ltd., Kariya, Japan

[21] Appl. No.: 996,691

[22] Filed: Dec. 24, 1992

[30] Foreign Application Priority Data

Dec. 27, 1991 [JP]  Japan .................................. 3-346324

[51] Int. Cl.[5] ............................................. F25D 17/06
[52] U.S. Cl. .......................................... 62/184; 62/90; 62/324.4
[58] Field of Search .................. 62/184, 324.4, 181, 62/90, 173

[56]  References Cited
U.S. PATENT DOCUMENTS 3,403,314  9/1968  Maynard .................. 62/184 UX
3,738,117  6/1973  Engel ............................. 62/90
4,920,756  5/1990  Howland ..................... 62/90 X

FOREIGN PATENT DOCUMENTS 60-29558  2/1985  Japan .

OTHER PUBLICATIONS

Iritani, et al appln. Ser. No. 07/873430 (see subject Appln. p. 1).

Primary Examiner—William E. Wayner
Attorney, Agent, or Firm—Cushman, Darby & Cushman

[57]  ABSTRACT

An air conditioning apparatus suitable for an electric powered automobile, where at least one of a heating and a dehumidifying operation is effected by utilizing a refrigerating cycle. An upstream heat exchanger and a downstream heat exchanger are arranged in a duct through which air passes for air conditioning. An outside heat exchanger with an outside fan are further provided, which act as a condenser in a cooling mode, although a refrigerant passes therethrough when using the heating and the dehumidifying modes. Upon use of a dehumidifying mode, the upstream heat exchanger acts as an evaporator, while the downstream heat exchanger acts as a condenser. The temperature of the refrigerant sensed by a temperature sensor at the outlet of the compressor if higher than a predetermined value (110° C.) when in the dehumidifying mode causes the outside fan to rotate, thereby increasing the condensing ability at the outside heat exchanger, reducing the amount of liquid refrigerant in the outside heat exchanger, and increasing the amount of liquid refrigerant in an accumulator, thereby preventing the temperature of the refrigerant from the compressor from increasing.

9 Claims, 12 Drawing Sheets

HEATING MODE

▒ LIQUID STALE

☐ GASEOUS STALE

DEHUMIDIFING MODE

AIR CONDITIONING APPARATUS

BACKGROUND OF THE INVENTION

1. Background of the Invention

The present invention relates to a system for an air conditioning unit utilizing a refrigeration cycle capable of obtaining either a cooling, or heating operation and a dehumidifying operation. The present invention is, in particular, suitable for an air conditioning system for an electrically operated automobile.

2. Description of the Related Art

Known in a related art is an air conditioning system where a refrigeration cycle is utilized for switching between a cooling or heating operation and a dehumidifying operation. See Japanese Patent Application No. 3-319417 corresponding U.S. Pat. application Ser. No. 07/873,430 now U.S. Pat No. 5,299,431 filed on Apr. 24, 1992 by the assignee of this patent application.

In the related art, the downstream heat exchanger acts as a condenser for imparting heat from the refrigerant to the air in a duct having outlets opened to desired locations of the cabin upon using both the heating and dehumidifying mode. The upstream heat exchanger is closed to the recirculated cycle upon using the heating mode. Upon use of the dehumidifying mode, the upstream heat exchanger is located in the refrigerating closed circuit for acting as an evaporator for removing heat from the air in the duct.

An outside heat exchanger is also located in the refrigerant closed circuit. In the prior art, the outside fan only acts as a passageway of the refrigerant upon use of the dehumidifying mode.

During the dehumidifying operation a large amount of refrigerant is required for the refrigerant cycle, thereby exhausting the liquid refrigerant in the accumulator. In order to prevent the same from occurring, an accumulator with a large volume is required.

SUMMARY OF THE INVENTION

An object of the present invention is to provide an air conditioning device capable of reducing the size of a container for a refrigerant, such as a receiver or accumulator for storing an excessive amount of the refrigerant.

According to the present invention, an air conditioning system for an area to be air conditioned, comprises:
- a duct for the introduction of an air flow into the cabin,
- a blower for generating the flow of air in the area,
- an upstream heat exchanger arranged in the duct for a heat exchange of a refrigerant with the air flow in the duct,
- a downstream heat exchanger arranged in the duct at a location downstream in the direction of the air flow for a heat exchange of the refrigerant with the air in the duct,
- an outside heat exchanger located outside of the duct for a heat exchange of the refrigerant with air outside of the area,
- a pressure reduction device arranged for reducing the pressure of the refrigerant,
- a container for storing an excessive amount of refrigerant,
- a compressor for compressing the refrigerant,
- a refrigerant circuit for connecting the upstream heat exchanger, downstream heat exchanger, the outside heat exchanger, the pressure reducing device, the refrigerant container and the compressor, wherein the refrigerant circuit is constructed such that, upon using a dehumidifying mode, the flow of refrigerant in the refrigerant circuit is obtained such that the compressed refrigerant from the compressor flows in order along the downstream heat exchanger, the outside heat exchanger, the pressure reduction device, and the upstream heat exchanger,
- means for varying the heat exchange ability between the refrigerant and the outside air in the outside heat exchanger,
- means for detecting the temperature of the refrigerant from the compressor, and
- means for controlling the heat exchange ability varying means for increasing the heat exchange ability in the outside heat exchanger when the temperature of the refrigerant from the compressor detected by the detection means is increased to a predetermined value.

DESCRIPTION OF PREFERRED EMBODIMENT

Figure 1A:
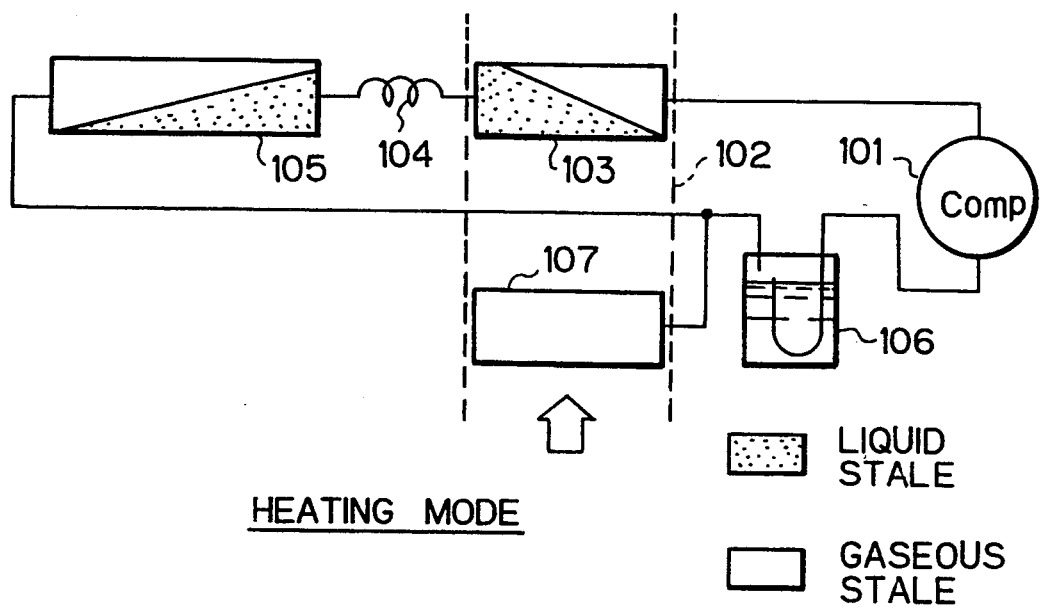
FIGS. 1(A) and 1(B) illustrate a refrigerating cycle for a heating mode and a dehumidifying mode, respectively, and illustrate the problem to be solved by the present invention.
Figure 1B:
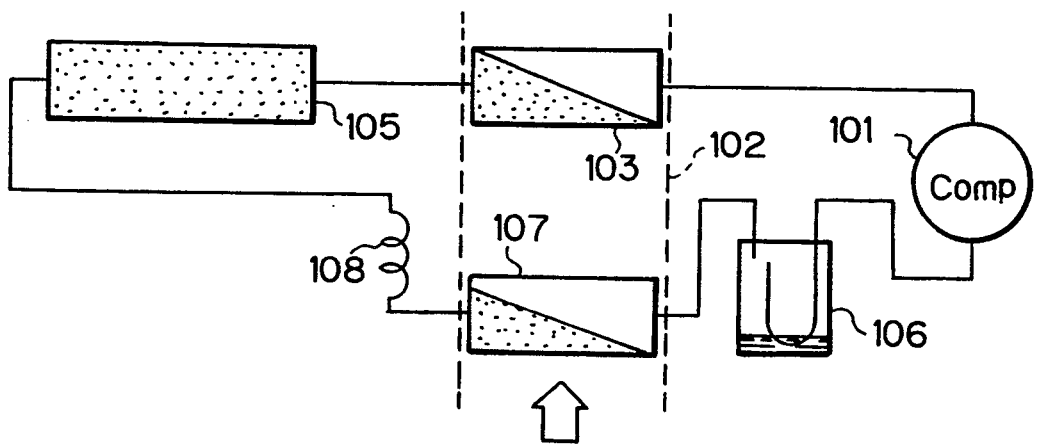

Now, the problem to be solved by the present invention will be explained with reference to FIGS. 1-(A) and (B), which show the construction of an air conditioning system disclosed in the Japanese Patent Application No. 3-319417, where a switching is performed between a heating mode and dehumidifying mode using a refrigerant cycle. FIG. 1-(A) shows the system under a heating mode, while FIG. 1-(B) shows the system under a dehumidifying mode. During the heating mode shown in FIG. 1-(A), the refrigerant compressed by a compressor 101 is in a gaseous state and subjected to compression by the compressor 101. The compressed refrigerant is condensed at a downstream side heat exchanger 103 in a duct 102 for emission of heat to the air in the duct. The refrigerant is then introduced into a pressure reduction device 104 for reducing its pressure and is directed to an outside heat exchanger 105 for a heat exchange with the air for evaporating the refrigerant by removing heat from the outside air. The evaporated refrigerant is introduced into an accumulator 106 for separating the gaseous refrigerant directed to the compressor 101. An upstream heat exchanger 107 is located in the duct 102 upstream from the downstream heat exchanger 103 in the flow of air in the duct 102. Under the heating mode, the refrigerant in liquid state in the upstream heat exchanger 107 is drawn into the accumulator 106.

When the system is under a dehumidifying mode as shown in FIG. 1-(B), the gaseous refrigerant compressed by the compressor is condensed at the downstream heat exchanger 103 in the duct 102 for emission of heat to the air, and is directed to the outside heat exchanger 105. The liquid refrigerant from the outside heat exchanger 105 is introduced into the pressure reduction device 108 for reducing the pressure of the refrigerant. The refrigerant of the reduced pressure is introduced into the upstream heat exchanger 107 for evaporating the refrigerant and absorbing the heat from the air passing in the duct 102 so that the air in the duct 102 directed to the downstream heat exchanger 103 is dehumidified. The refrigerant in the upstream heat exchanger 107 is introduced into the accumulator 106 for separating the gaseous refrigerant directed into the compressor 101.

The minimum amount of refrigerant in the heat exchangers 103, 105 and 107 is obtained when the system load is low and the mode is heating. Contrary to this, the maximum amount of refrigerant in the heat exchangers 103, 105 and 107 is obtained when the load of the system is high and the mode is dehumidifying. Namely, the amount of excessive liquid state refrigerant in the accumulator 103 attains maximum value when the load of the system is low and the mode is heating. Contrary to this, the amount of excessive liquid refrigerant in the accumulator 103 attains minimum value when the load of the system is high and the mode is dehumidifying. The volume of the accumulator 106 must be sufficiently large to prevent the liquid refrigerant from being introduced into the compressor even when the amount of liquid refrigerant in the accumulator attains maximum value owing to the low load conditions under the heating mode. Furthermore, the total amount of refrigerant recirculated in the cycle must be large enough to allow the liquid refrigerant to be stored in the accumulator 106 at all times, which otherwise has an adverse effect on the compressor and/or its driving device.

Such a stipulation requires the accumulator 106 to be of a relatively large size and increases the amount of refrigerant in the system to be consumed which is not suitable for an air conditioning system of an automobile, since a small accumulator is preferred for such an application.

Figure 2:
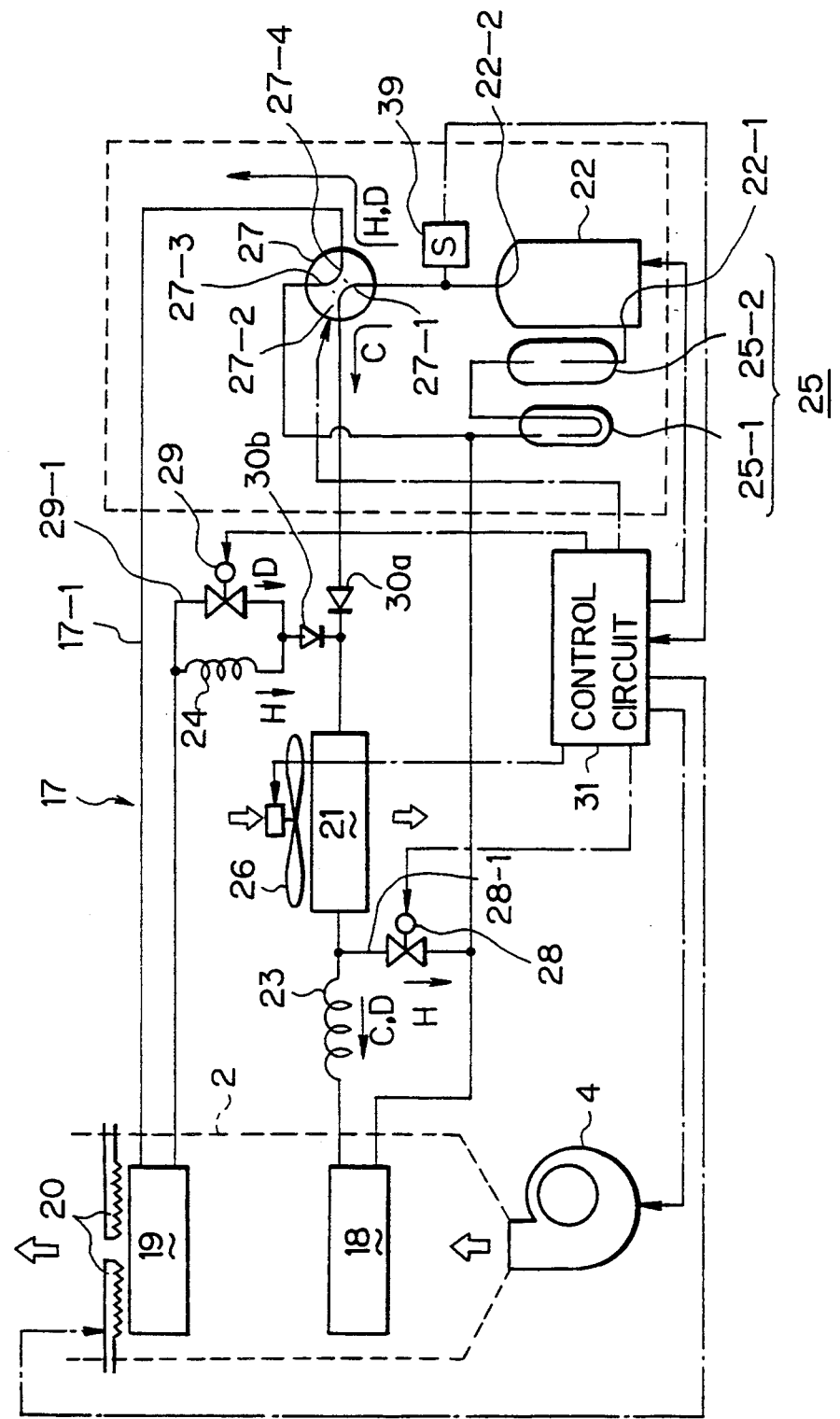
FIG. 2 shows a refrigerating circuit in a first embodiment of the present invention.
Figure 3:
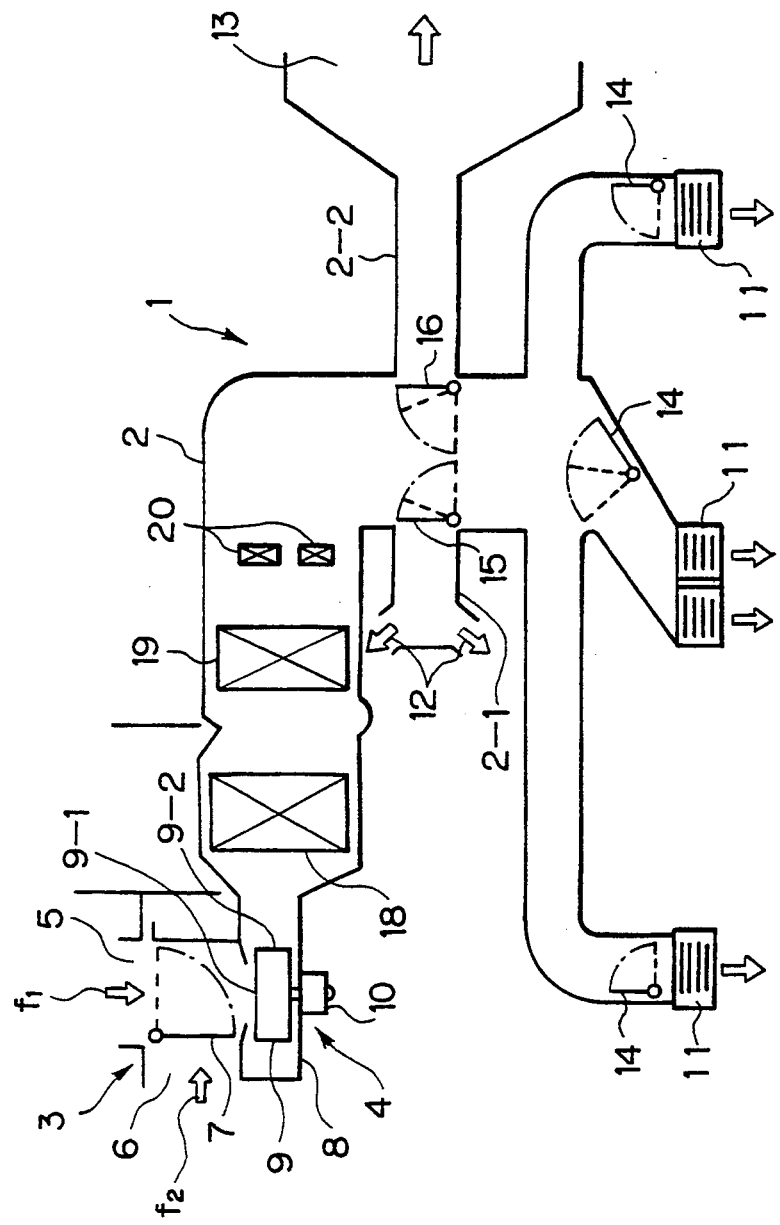
FIG. 3 shows a schematic view of the air duct of the air conditioning system according to the present invention.

A first embodiment of the present invention capable of overcoming the above mentioned problem will be explained referring to FIGS. 2 to 6. In FIGS. 2 and 3, reference numeral 1 generally denotes an air conditioning apparatus for an automobile, which includes a duct 2 having a first or downstream end opened to various locations of the cabin and a second or upstream end for introduction of the outside or inside air. Namely, at the second end, the duct 2 forms an inner air induction port 5 for introduction of the air in the cabin after being subjected to air conditioning and an outside air induction port 6 for introduction of fresh air outside the vehicle. A switching device 3 is provided, which has a damper 7 for movement between a position shown by a solid line, where the inside air is introduced into the duct 2 as shown by an arrow $f_2$, and a position shown by a dotted line, where the outside air is introduced into the duct 2, as shown by an arrow $f_2$. The switching device 3 is further provided with an actuator (not shown) for obtaining the switching movement of the damper 7.

A fan device 4 is provided that is constructed by a fan member 9 arranged in the duct at a position downstream from the damper 7, a casing 8 as a part of the duct 2 for storing the fan member 9 therein, and an electric motor 10 connected to the fan member 9 for obtaining a rotational movement of the fan 9. The fan 9 is provided with an axial inlet 9-1 for introduction of the air from the inner air inlet 5 or outer air inlet 6, and a circumferential outlet 9-2 for radially discharging the air and creating a flow of air in the duct 2.

At the downstream end of the duct, it forms a plurality of outlets for discharging the air flows to desired locations of the cabin, which are top outlets (ventilation outlets) 11 for generating low temperature air flows toward head and waist portions of a passenger, bottom outlets (foot outlets) 12 for generating high temperature air flows directed to bottom portions of the passenger, and a defroster outlet 13 for generating high temperature air flows directed at the windshield. Dampers 14 are provided in duct portions directed to respective ventilation outlets 11 for controlling the air flow into the cabin from the respective outlets 11. A damper 15 is arranged in the duct 2 for controlling the air flows into a duct portion 2-1 to the bottom outlets 12. Furthermore, a damper 16 is provided in the duct 2 for controlling the air flows into a duct portion 2—2 directed to the defroster outlet 13.

Arranged in the duct 2 directly downstream from the fan member 9 are an upstream heat exchanger 18 and a downstream heat exchanger 19, which are arranged in series in the duct 2. These heat exchangers 18 and 19 have pipes (not shown) for receiving all of the refrigerant in the refrigeration cycle for heat exchange with the air passing the duct 2. The downstream heat exchanger 19 operates only as a condenser wherein the refrigerant is subjected to condensation for imparting heat to the air contacting thereto. Arranged downstream from the downstream heat exchanger are electrically operated auxiliary heaters 20 constructed by elements such as a PTC (positive temperature coefficient) element, which generates, when it is energized, heat for heating the air passing through the duct 2.

FIG. 2 illustrates how the refrigeration cycle 17 is constructed according to the first embodiment. The refrigerating cycle 17 as an accumulator cycle has a closed circuit 17-1, on which, in addition to the upstream and downstream heat exchangers 18 and 19, an outside heat exchanger 21, a compressor 22, a first pressure reducer (expansion valve) 23, a second pressure reducer (expansion valve) 24, an accumulator 25, and a flow switching valve device 27 for obtaining a desired flow direction of the refrigerant.

The outside heat exchanger 21 is for heat exchange between the air outside the duct 2 and the refrigerant in the refrigeration cycle 17. An outside fan 26 is located for generating a flow of the outside air, and is selectively operated for controlling the condensing ability of the outside heat exchanger 21 when the dehumidifying mode is selected. Namely, upon using the dehumidifying mode, the operation of the outside fan 26 is switched between a stop condition where the operation of the fan 26 is stopped, thereby causing the outside heat exchanger 21 to operate as a mere passageway for the condensed refrigerant, and a rotational condition where the fan 26 is subjected to a low rotational speed, which enhances the condensing ability of the refrigerant.

The compressor 22 is connected to an electric motor (not shown) imparting a rotational speed thereto for drawing the refrigerant and for expelling the refrigerant. The compressor 22 is, together with the electric motor, housed in a sealed housing. The electric motor is connected to an inventer type controller for obtaining a variable rotational speed, which causes the displacement volume of the compressor 22 to change. The change in the volume of refrigerant expelled from the compressor as a result of the change in the rotational speed of the motor is, according to the embodiment, utilized for controlling the temperature of the air issued to the cabin.

The first pressure reducer 23 is a capillary tube of a predetermined fixed throttle, and is, in the refrigerating circuit, arranged between the outside heat exchanger 21 and the upstream heat exchanger 18 for reducing the pressure of the refrigerant directed from the outside heat exchanger 21 to the upstream heat exchanger 18. The second pressure reducer 24 is also a capillary tube of a predetermined fixed throttle, and is arranged between the downstream heat exchanger 19 and the outside heat exchanger 21 for reducing the pressure of the refrigerant from the downstream heat exchanger 19 to the outside heat exchanger 21.

An accumulator 25 constructed by a series of containers 25-1 and 25-2 is arranged between the upstream heat exchanger 18 and the inlet 22-1 of the compressor 22 for storing therein an excessive amount of state refrigerant for the refrigerating cycle and for supplying a gaseous refrigerant only to the inlet 22-1 of the compressor 25. Namely, the accumulator 25 can prevent the liquid state refrigerant from being introduced into the compressor 25. The volume of the accumulator 22 is such that it can store the maximum amount of liquid refrigerant obtained under low load conditions upon cooling and heating, and also prevents the liquid refrigerant from being introduced into the compressor. For a refrigerating cycle in an air conditioning system for a common automobile, the volume of the accumulator 25 is sufficient if it is in a range between 600 to 1000 ml.

The flow switching valve is for switching the direction of the flow of the refrigerant between the cooling mode, a heating mode and a dehumidify mode. Namely, a first four port two position valve 27 is provided that has a first port 27-1 connected to the output 22-2 of the compressor, a second port 27-2 connected to the outside heat exchanger 21, a third port 27-3 connected to the inlet side of the accumulator 25, and a fourth port 27-4 connected to the downstream heat exchanger 19. The switching valve 27 is moved between a first (cooling mode) position where, as shown by solid lines, the first and second ports 27-1 and 27-2 are connected, and the third and fourth ports 27-3 and 27-4 are connected, and a second (other modes) position where, as shown by dotted lines, the first and fourth ports 27-1 and 27-4 are connected, and the second and third ports 27-2 and 27-3 are connected. A first electromagnetic ON-OFF valve 28 is arranged on a passageway 28-1 connected to the refrigerant recirculation circuit 17-1 so as to by-pass the first pressure reducer 23 and the upstream heat exchanger 18 in series when the air conditioning system is in the heating mode. Furthermore, a second electromagnetic ON-OFF valve 29 is arranged on a passageway 29-1 connected to the refrigerant recirculation circuit 17-1 to by-pass the second pressure reducer 24 when the air conditioning system is in the dehumidifying mode. A first check valve 30a is arranged on the recirculation passageway 17-1 at a position between the switching valve 27 and the outside heat exchanger 21 for allowing only a flow from the switching valve 27 to the outside heat exchanger 21 as shown by an arrow C. Furthermore, a second check valve 30b is arranged on the recirculating line 17-1 at a location between the second pressure reducer 24 and the outside heat exchanger 21 for allowing only a flow from the downstream heat exchanger 19 to the outside heat exchanger 21 as shown by an arrow H upon using the heating mode or D upon using dehumidifying mode.

In the cooling mode, the switching valve 27 is in its first position while the electromagnetic valve 28 is closed, so that a closed flow of refrigerant is obtained in the following order, that is, the outlet 22-2 of the compressor 22, the first port 27-1, the second port 27-2 (the arrow C), the check valve 30a, the outside heat exchanger 21, the first pressure reducer 23 (the arrow C), the upstream heat exchanger 18, the accumulator 25 and the inlet 22-1 of the compressor 22. Namely, the direction of the flow of the refrigerant in the cooling mode is designated by the arrows C.

In the heating mode, the switching valve 27 is in its second position, while the first electromagnetic valve 28 is energized while the second electromagnetic valve 29 is de-energized, so that a closed flow of refrigerant is obtained in the following order, that is, the outlet 22-2 of the compressor 22, the first port 27-1, the fourth port 27-4 (the arrow H), the downstream heat exchanger 19, the second pressure reducer 24 (the arrow H), the check valve 30b, the outside heat exchanger 21, the first electromagnetic valve 28 (the arrow H), the accumulator 25, and the inlet 22-1 of the compressor 22. Namely, the direction of the flow of the refrigerant in the heating mode is designated by the arrows H.

In the dehumidifying mode, the switching valve 27 is in its second position, while the first electromagnetic valve 28 is de-energized while the second electromagnetic valve 29 is energized, so that a closed flow of refrigerant is obtained in the following order, that is, the outlet 22-2 of the compressor 22, the first port 27-1, the fourth port 27-4 (the arrow D), the downstream heat exchanger 19, the second electromagnetic valve 29 (the arrow D), the check valve 30b, the outside heat exchanger 21, the first pressure reducer 23 (the arrow D), the upstream heat exchanger 18, the accumulator 25, and the inlet 22-1 of the compressor 22. Namely, the direction of the flow of the refrigerant in the dehumidifying mode is designated by the arrows D.

A control circuit 31 is provided for controlling the fan 4, the auxiliary heater 20, the outside fan 26, the motor (not shown) for operating the compressor 22, the four port switching valve 27, the first electromagnetic valve 28, second electromagnetic valve 29, and motors (not shown) for operating the dampers 11, 12, 15 and 16 in FIG. 3.

Figure 4:
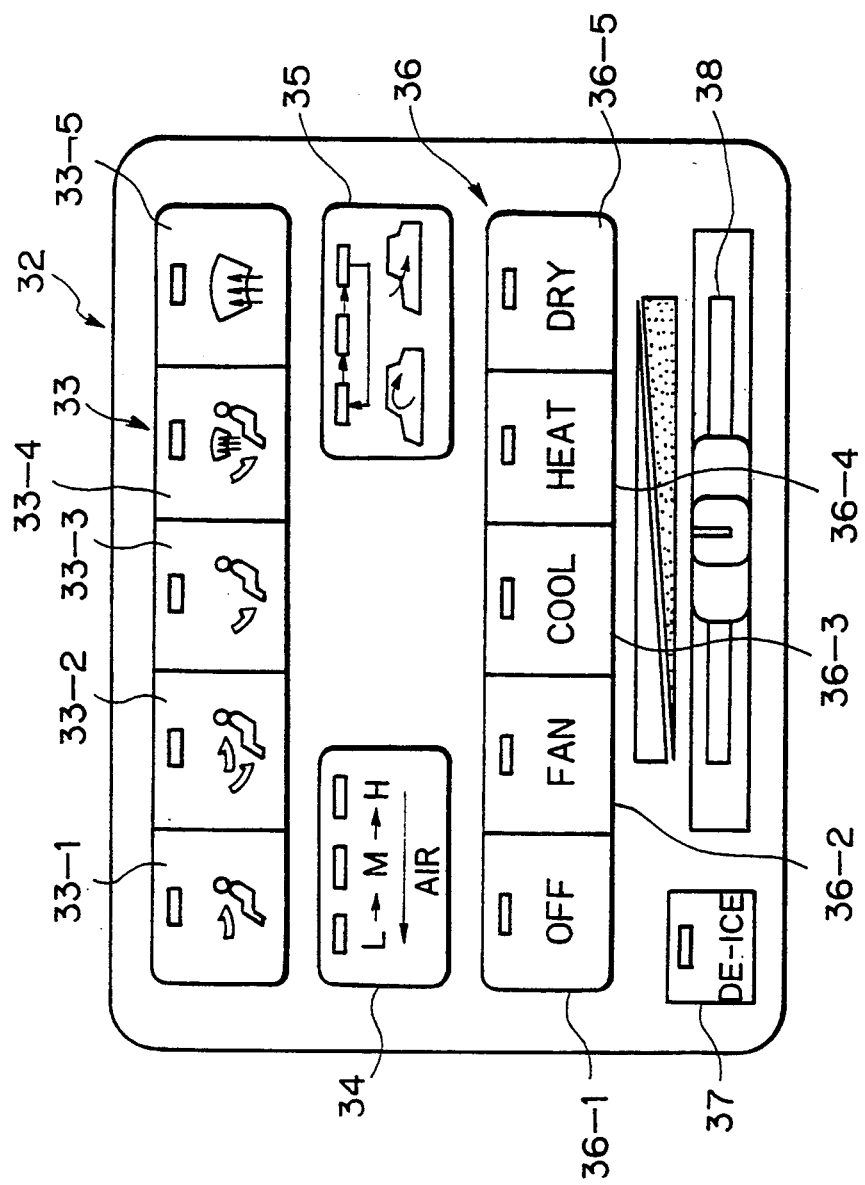
FIG. 4 shows an arrangement of a control panel of the air conditioning system according to the present invention.

FIG. 4 shows an arrangement of a control panel 32 for the control circuit 31 in FIG. 2. The control panel 32 in FIG. 4 is arranged at a suitable location in the cabin of the automobile. The panel 32 is provided with a mode selection section 33 for selecting a desired mode, an air amount control switch 34 for obtaining a desired amount of air flow into the cabin, an inlet selection switch 35 for selecting an air inlet between the inside air mode and the outside air mode, a mode selection section 36 for selecting a desired mode, a de-icing switch 37 for de-icing the outside heat exchanger 21 upon using the heating mode, and a temperature control lever 38 for controlling the rotational speed of the compressor 22 at the respective modes as selected. Namely, the flow amount section 33 includes a high level mode button 33-1 for obtaining an air flow from the top (ventilation) outlets 11, a bi-level mode button 33-2 for obtaining an air flow from both the top and bottom outlets 11 and 12, a bottom level mode button 33-3 for obtaining an air flow from the bottom level outlets 12, a DEF/VENT mode button 33-4 for obtaining an air flow from both the defroster outlet 13 and the bottom level outlet 12, and a defroster mode button 33-5 for obtaining an air flow from the defroster outlet 33-5. The air amount control switch 34 is for switching the amount of air in the duct 2 between high (H), medium (M) and low (L) amounts. The selection switch 35 is for selecting between conditions where the outside air is introduced, where the inside air is recirculated, and where both outside air introduction and inside air recirculation takes place. The mode select section 36 is constructed so as to include a button 36-1 for stopping the operation, a button 36-2 for controlling the operation of the fan 4, a button 36-3 for obtaining a cooling operation, a button 36-4 for obtaining a heating operation, and a button 36-5 for obtaining a dehumidifying (DRY) operation.

As shown in FIG. 2, a temperature sensor 39 is provided at a position of the recirculation passageway 17-1 downstream from the outlet 22-2 of the compressor 22 for detection of the temperature of the refrigerant. The control circuit 31 operates to control the outside fan 26 in such a manner that, when the temperature of the refrigerant as detected by the sensor 39 is higher than a predetermined value, such as, 110° C., the outside fan 26 is subjected to a slow speed rotational movement, which increases the condensing ability at the outside heat exchanger 22 in the dehumidifying mode. When the temperature of the refrigerant detected by the sensor 39 is below a predetermined value, such as, 109° C., the control circuit 31 stops the rotational movement of the outside fan 26, which causes the outside heat exchanger 21 to function merely as a passageway of the refrigerant in the dehumidifying mode.

The operation of the first embodiment will now be explained. The control panel 32 is operated by a passenger such that the cooling button 36-3 is pushed to select the cooling mode. In this case, the outside air or inside air in accordance with the setting of the damper 7 is introduced into the duct 2, and is in contact with the upstream heat exchanger 18 and the downstream heat exchanger 19. Furthermore, the air is in contact with the auxiliary heater 20, and is discharged from outlets selected by the setting of the dampers 14, 15 and 16. The amount of air is controlled by the setting of the control lever 38. In the cooling mode, as explained above, the switching valve 27 is in its first position, while the first electromagnetic valve 28 is de-energized while the second electromagnetic valve 29 is de-energized, so that the recirculated flow of the refrigerant, as shown by the arrows C, is obtained. Namely, the high temperature gaseous refrigerant from the outlet 22-2 of the compressor 22 is, via the ports 27-1 and 27-2 and the check valve 30a, directed to the outside heat exchanger 21 for condensing the refrigerant thereat while the outside fan 26 is rotated, so that the heat generated by condensing is emitted. The condensed liquid is introduced into the first pressure reducer 23 for reducing the pressure of the refrigerant. The refrigerant of the reduced pressure from the first pressure reducer 23 is introduced into the upstream heat exchanger 18 where the refrigerant is vaporized, so that the heat from the air in contact with the upstream heat exchanger 18 is absorbed, thereby reducing the temperature of the air introduced into the cabin. The gaseous refrigerant from the upstream heat exchanger 18 is directed to the accumulator 25 where the liquid refrigerant is separated, and a gaseous refrigerant is drawn by the compressor 22 for repeating the above mentioned cycle.

The control panel 32 is operated by a passenger so that the heating switch 36-4 is pushed to select the heating mode. In the heating mode, as explained above, the switching valve 27 is in its second position, while the first electromagnetic valve 28 is energized while the second electromagnetic valve 29 is de-energized, so that the recirculated flow of the refrigerant as shown by the arrows H is obtained. Namely, the high temperature gaseous refrigerant from the outlet 22-2 of the compressor 22 is, via the ports 27-1 and 27-4, directed to the downstream heat exchanger 19 so that a heat exchange between the gaseous refrigerant and the air flow in the duct 2 takes place, which causes the heat to be emitted from the refrigerant in the downstream heat exchanger 19 to the air in contact therewith, and thereby heating the air, and condensing the refrigerant to a liquid. The condensed, liquid state refrigerant is introduced into the second pressure reducer 24 for reducing the pressure of the refrigerant. The refrigerant of the reduced pressure is, via the check valve 30b, introduced into the outside heat exchanger 21 where the refrigerant is evaporated for absorbing heat from the outside air. The evaporated refrigerant at the outside heat exchanger 21 is, via the first electromagnetic valve 28, introduced into the accumulator 25, and is returned into the compressor 22 for repeating the above mentioned cycle.

The de-icing switch 37 is operated when ice is, upon using the heating mode, created on the surface of the heat exchange pipe (not shown) of the outside heat exchanger 21 used as a reduced temperature evaporator. The operation of the de-icing switch 37 causes the first electromagnetic valve 28 to be closed and the second electromagnetic valve 29 to be opened, so that a recirculated flow of the refrigerant as shown by arrows D is obtained, similar to the dehumidifying mode as explained later. Namely, the refrigerant is passed through the first pressure reducer 23 and by-passes the second pressure reducer 24. As a result, the outside heat exchanger 21 now merely operates as a passageway of the high temperature gaseous refrigerant. As a result, the outside heat exchanger 21 is gradually de-iced or defrosted.

The control panel 32 is operated by a passenger so that the dehumidify button 36-5 is pushed to select the dehumidify mode. In this case, the outside air or inside air in accordance with the setting of the damper 7 is introduced into the duct 2, and is contacted with the upstream heat exchanger 18 and the downstream heat exchanger 19. Furthermore, the air is contacted with the auxiliary heater 20, and is discharged from outlets selected by the setting of the dampers 14, 15 and 16. The amount of air is controlled by the setting of the controller 38. In the dehumidifying mode, as explained above, the switching valve 27 is in its second position, while the first electromagnetic valve 28 is de-energized while the second electromagnetic valve 29 is energized, so that the recirculated flow of the refrigerant as shown by the arrows D is obtained. Namely, the high temperature gaseous refrigerant from the outlet 22-2 of the compressor 22 is, via the ports 27-1 and 27-4, directed to the downstream heat exchanger 19 so that a heat exchange between the gaseous refrigerant and the air flow in the duct 2 takes place, which causes heat to be emitted from the refrigerant in the downstream heat exchanger 19 to the air contacting therewith and thereby heating the air to be heated, and condensing the refrigerant to a liquid state. The condensed, liquid state refrigerant is, via the opened second electromagnetic valve 29 and the check valve 30b, introduced into the outside heat exchanger 21. If the outside fan 26 is in the de-energized state owing to a low or medium load condition, the liquid state refrigerant is merely passed through the outside heat exchanger 21, and is directed to the first pressure reducer 23, where the liquid state refrigerant is subjected to expansion under a reduced pressure state. The refrigerant of the reduced pressure from the pressure reducer 23 is in a mist state when introduced into the upstream heat exchanger 18, where a heat exchange takes place between the refrigerant in the upstream heat exchanger 18 and the air in the duct 2, so that the refrigerant absorbs heat from the air in the duct 2 while it is vaporized. The vaporized refrigerant at the upstream heat exchanger 18 is, via the accumulator 25, returned to the inlet 22-1 of the compressor 22 for repeating the refrigeration cycle as mentioned above.

In short, during the dehumidifying operation with a low or medium load conditions, the total amount of refrigerant used in the heat exchangers 18, 19 and 21 does not reach the maximum value, so that a liquid state refrigerant remains in the accumulator 25, which prevents the temperature of the refrigerant at the outlet 22-2 of the compressor from exceeding the above mentioned threshold value of 110° C.

During this dehumidifying mode, the temperature of the air in the duct 2 in contact with the upstream heat exchanger 18 is reduced, which causes the saturated vapor of the water in the air to condense, so that the condensed water is attached to the outer surface of the pipe constructing the upstream heat exchanger 18. As a result, the air with a reduced degree of humidity is directed to the downstream heat exchanger 19, where the air is heated and discharged into the cabin.

Figure 5:
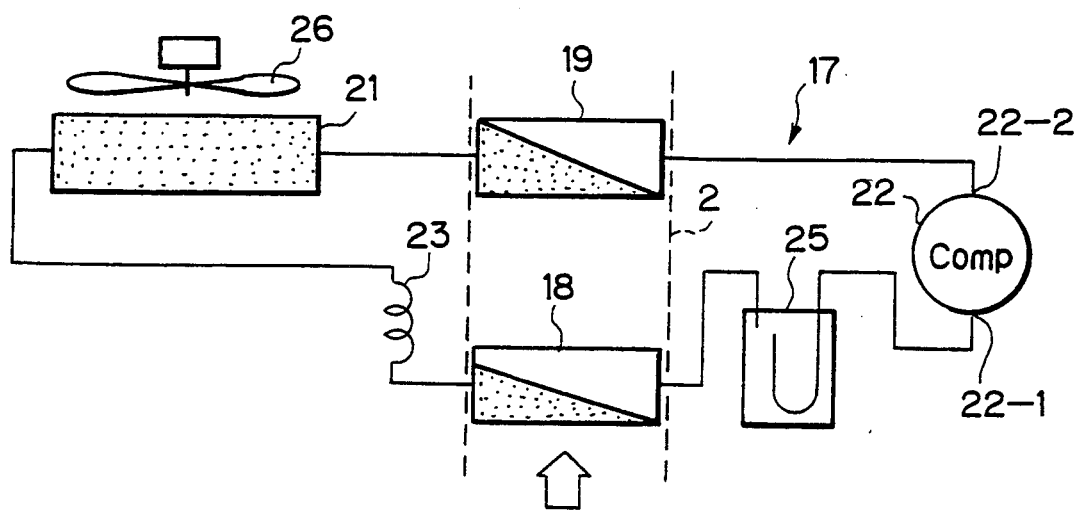
FIGS. 5 and 6 show closed flows of the refrigerant during the operation of the present invention.
Figure 6:
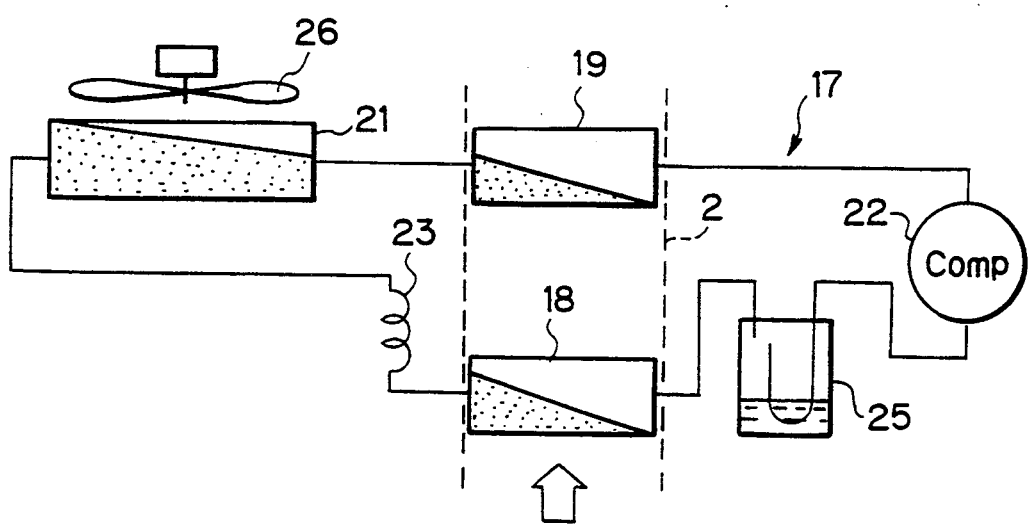
Figure 7A:
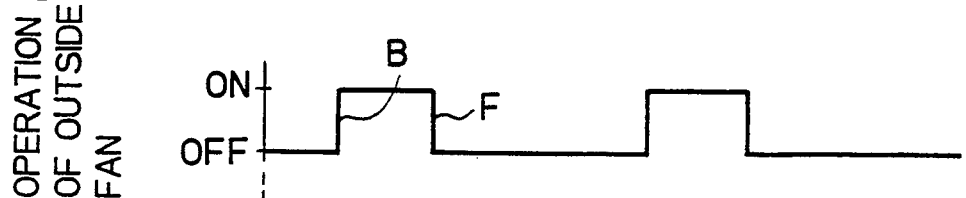
FIGS. 7(A) to 7(D) show time charts illustrating the operation of the present invention.
Figure 7B:
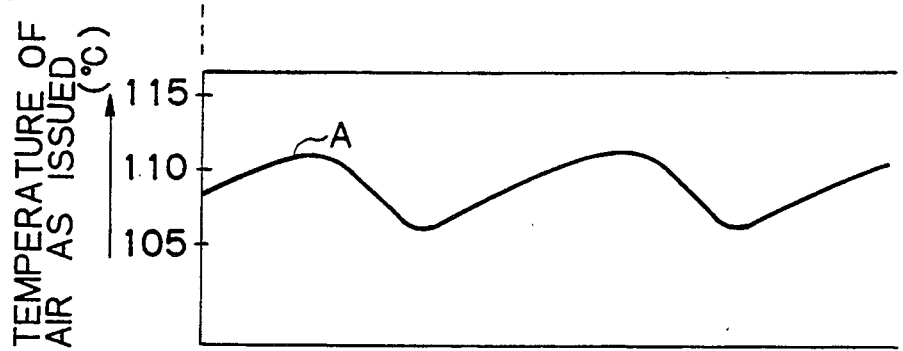
Figure 7C:
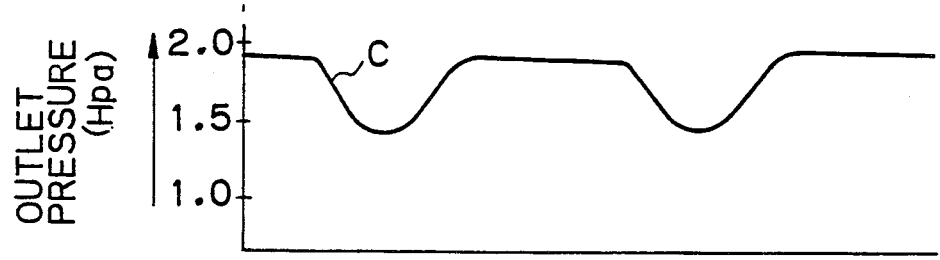
Figure 7D:
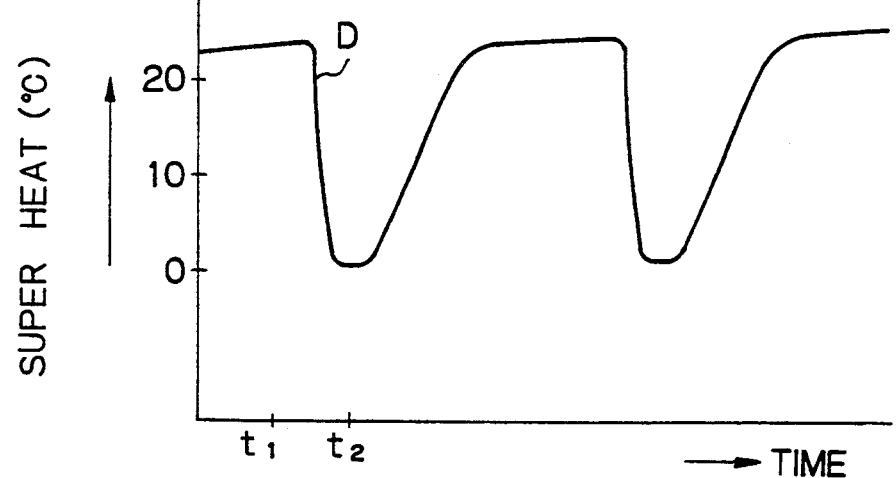

An increase in the load during the dehumidifying mode increases the amount of the refrigerant required by the heat exchangers 18, 19 and 20, which empties the liquid refrigerant in the accumulator 25 as shown in FIG. 5, resulting in an increase in the temperature of the refrigerant at the output 22-2 of the compressor 22. When the temperature at the output 22-2 of the compressor 22 exceeds the predetermined value of 110° C. at time $t_1$ as shown by a curve A in FIG. 7-(B), the outside fan 26 is turned ON as shown by a line B in FIG. 7-(A) so that a low speed rotational movement of the fan 26 is obtained. As a result of the rotational movement of the outside fan 26, an increase in the efficiency of the outside heat exchanger 21 for condensing the refrigerant at the outside heat exchanger 21 is obtained, which reduces the amount of refrigerant in the outside heat exchanger 21, which results in liquid refrigerant being supplied to the accumulator 25 as shown in FIG. 6. As a result, the pressure of the gaseous refrigerant at the outlet 22-2 is reduced as shown by a curve C in FIG. 7-(C), and the degree of super heat from the refrigerant drawn into the compressor 22 is reduced as shown by a curve D in FIG. 7-(D) thereby lowering the temperature of the refrigerant from the outlet 22-2 of the compressor 22.

When the temperature of the refrigerant from the outlet 22-2 of the compressor 22 detected by the temperature sensor 39 becomes lower than the second threshold value 109° C. at time $t_2$, the controller 31 turns off the outside fan 26 as shown by a line F in FIG. 7-(A), so that the outside air heat exchanger 21 operates merely as a passageway of the refrigerant to the upstream heat exchanger 18. The above mentioned repetition of the ON-OFF control of the outside fan 26 is repeated during high load dehumidifying operations so that the temperature of the refrigerant from the compressor 22 is prevented from increasing to any significant degree.

The above mentioned first embodiment of the present invention can maintain a temperature of the refrigerant lower than the predetermined value during a high load operation in the dehumidifying mode while using a small volume of the accumulator 25, i.e., small amount of the refrigerant used for the refrigerating cycle. Namely, the total volume and weight of the air conditioning system can be reduced.

According to the above mentioned first embodiment, irrespective of the modes as selected, the upstream heat exchanger 18 always operates only as an evaporator (cooling and dehumidifying modes), while the downstream heat exchanger 19 only operates as a condenser (heating mode). This means that switching functions between the condenser and evaporator does not take place for both heat exchangers 18 and 19. This is advantageous in that an evaporation of the drain water in the heat exchanger operating as the evaporator does not occur upon switching, which would otherwise cause the windshield to become clouded with moisture.

Furthermore, the air-conditioning system in the first embodiment is suitable for an automobile powered by an electric motor since the system uses, as a heat source, a heated refrigerant only.

Figure 8:
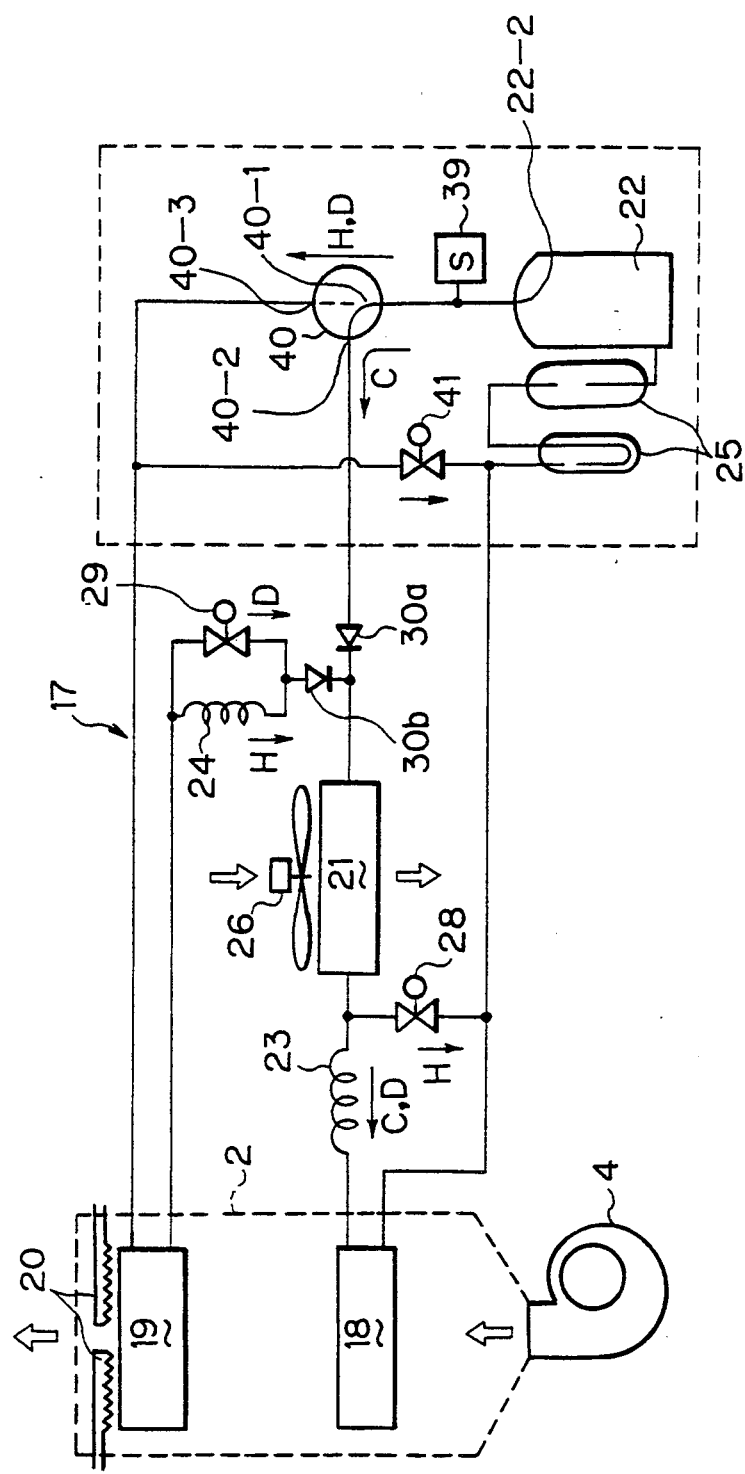
FIGS. 8 to 13 are similar to FIG. 2, but show various embodiments, respectively, of the present invention.

FIG. 8 shows a second embodiment, wherein, in place of the four port switching valve 27, a three port two position switching valve 40 is employed. In addition, a third electromagnetic ON-OFF valve 41 is provided. The switching valve 40 has a first port 40-1 connected to the output 22-2 of the compressor 22, a second port 40-2 connected to the check valve 30a to the outside heat exchanger 21, and a third port 42-3 connected to the downstream heat exchanger 19 in the duct 2. The switching valve 40 is moved between a first position where the first port 40-1 is connected to the second port 40-2, and a second position where the first port 40-1 is connected to the third port 40-3. In a cooling mode, the switching valve 40 is in its first position for obtaining a flow of the refrigerant as shown by arrows C, similar to the first embodiment. In this cooling mode, the electromagnetic valve 41 is opened for returning a liquid refrigerant in the downstream heat exchanger 19 to the accumulator 19. In the heating or dehumidifying (dry) mode, the switching valve 40 is switched to the second position for obtaining the flows of the refrigerant as shown by arrows H or D, similar to the first embodiment. In this heating or dehumidifying mode, the electromagnetic valve 41 is in a closed position.

Figure 9:
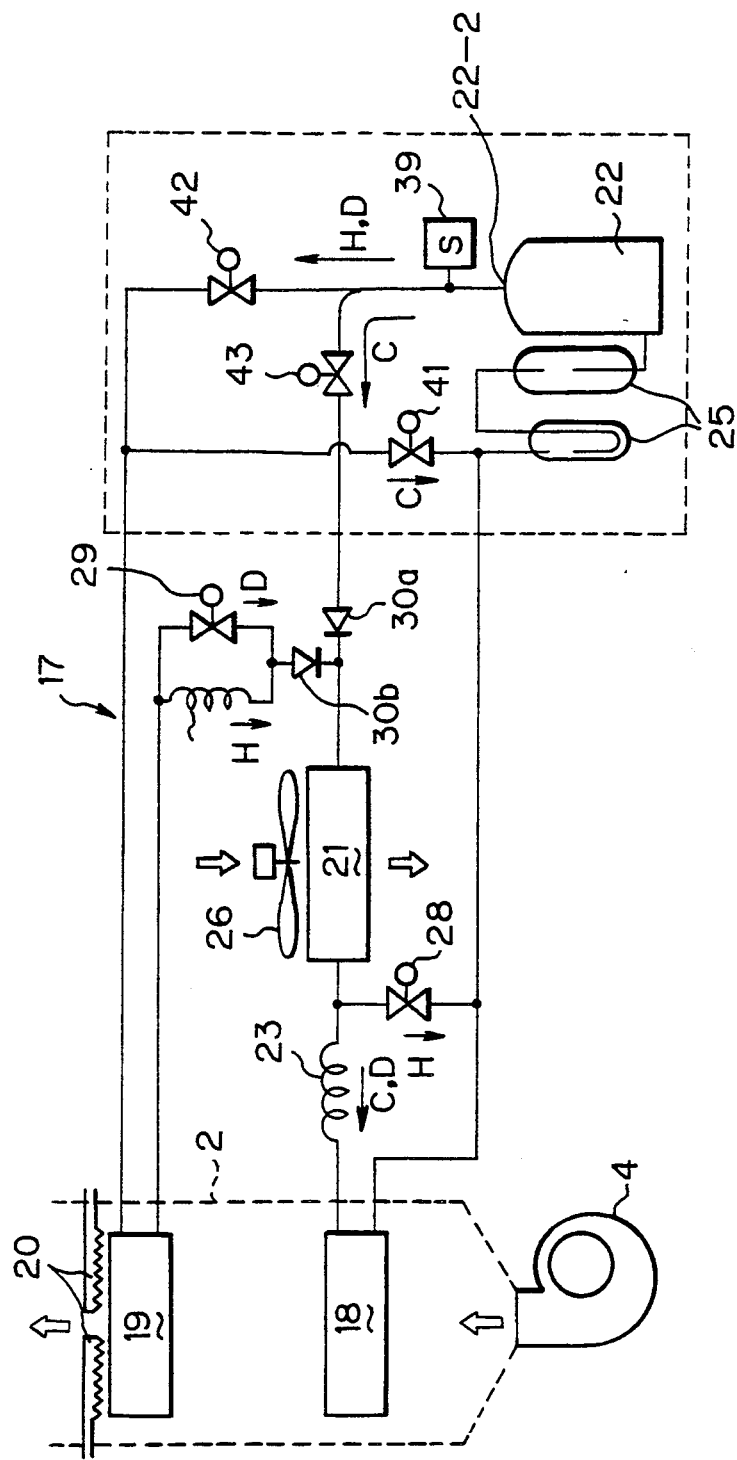

FIG. 9 is a third embodiment of the present invention. In this case, in place of the three port switching valve 40 in the second embodiment, fourth and fifth electromagnetic ON-OFF valves 42 and 43 are provided. The fourth electromagnetic valve 42 is located on a portion of the recirculating circuit between the outlet 22-2 of the compressor 22 and the downstream heat exchanger 19. The fifth electromagnetic valve 43 is located on a portion of the recirculating circuit between the outlet 22-2 of the compressor 22 and the check valve 30a to the outside heat exchanger 21. In a cooling mode, the fourth electromagnetic valve 42 is closed and a fifth electromagnetic valve 43 is opened for obtaining a flow of the refrigerant as shown by arrows C, similar to the first and second embodiments. In the heating or dehumidifying (dry) mode, the fourth electromagnetic valve 42 is opened and a fifth electromagnetic valve 43 is closed for obtaining a flow of the refrigerant as shown by arrows H or D, similar to the first and second embodiment. The operation of the third electromagnetic valve 41 is the same as that in the third embodiment in FIG. 8.

Figure 10:
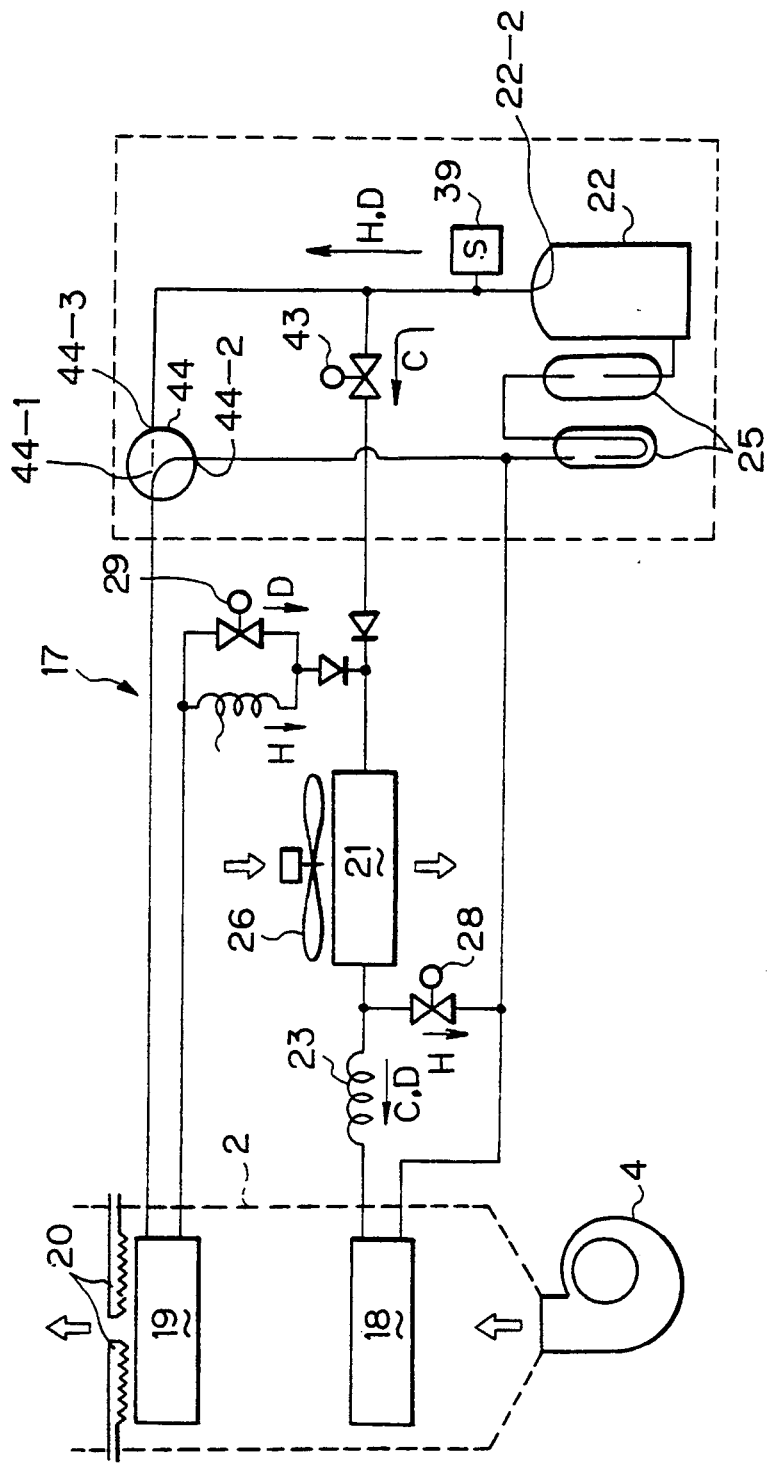

FIG. 10 is a fourth embodiment of the present invention. In this embodiment, in place of the electromagnetic valves 41 and 42 in FIG. 9, a three port two position switching valve 44 is provided. The switching valve 44 has a first port 44-1 connected to the downstream heat exchanger 19, a second port 44-2 connected to the accumulator 25, and a third port 44-3 convected to the outlet 22-2 of the compressor. The switching valve 44 is moved between a first position where the first port 40-1 is connected to the second port 40-2, and a second position where the first port 40-1 is connected to the third port 40-3. In a cooling mode, the switching valve 44 is in its first position for rerunning the liquid state refrigerant from the downstream heat exchanger 19 to the accumulator 25, and the electromagnetic valve 43 is opened for obtaining a flow of the refrigerant as shown by arrows C, similar to the first, second and third embodiments. In the heating or dehumidifying (dry) mode, the switching valve 44 is switched to the second position while the electromagnetic valve 43 is closed for obtaining the flows of the refrigerant as shown by arrows H or D, similar to the first, second and the third embodiment.

Figure 11:
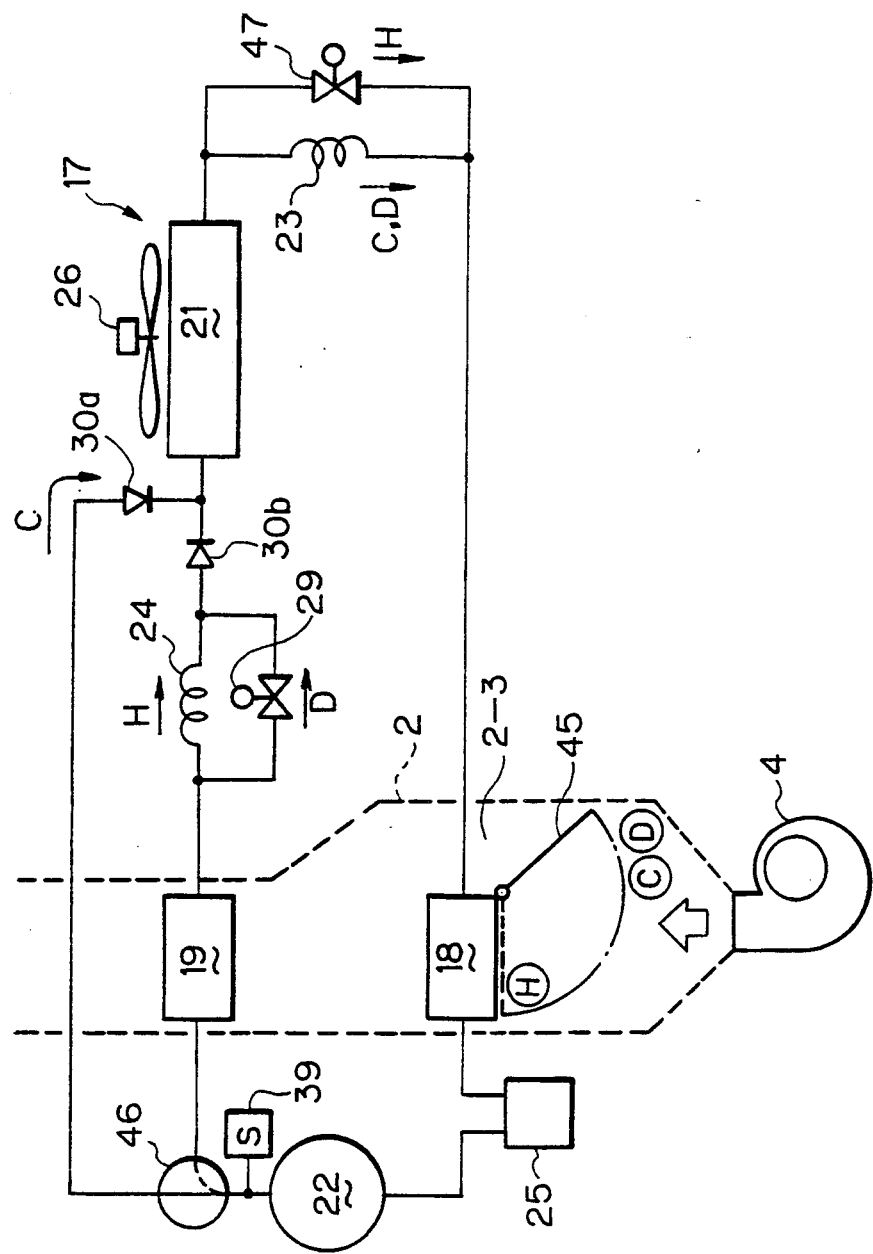

FIG. 11 shows a fifth embodiment with a construction wherein the refrigerant always flows to the upstream heat exchanger 18. A by-pass passageway 2-3 and a damper 45 are provided. The damper 45 is moved between a position as shown by a dotted line to close the upstream heat exchanger 18 for obtaining a flow of the air via the by pass passageway 2-3, and a position as shown by a solid line to open the upstream heat exchanger 18 for obtaining an air flow passing therethrough. In other words, the difference of the fifth embodiment from the first to fourth embodiments is that, in the fifth embodiment, an electromagnetic valve 47 opened when using the heating mode is arranged parallel to the first pressure reducer 23 between the outside heat exchanger 21 and the upstream heat exchanger 18, and, in the first to fourth embodiments, the electromagnetic valve 28 opened when using heating mode is arranged so as to by-pass the first pressure reducer 23 and the upstream heat exchanger 18. The damper 45 is provided for closing the upstream heat exchanger 18 upon using the heating mode for preventing a heat exchange to occur between the refrigerant and the air in the duct 2 when using the heating mode. A three port two position valve 46 that is similar to the valve 40 in the embodiment in FIG. 8 is provided for switching between a position (solid line) for introducing the refrigerant into the outside heat exchanger 21 and a position for introducing the refrigerant into the downstream heat exchanger 19.

The embodiment in FIG. 11 operates as follows. Upon using the cooling mode, the switching valve 46 is in its solid line position so that a closed flow of refrigerant is obtained in the following order, that is, the compressor 22, the switching valve 46 (the arrow C), the check valve 30a, the outside heat exchanger 21, the first pressure reducer 23 (the arrow C), the upstream heat exchanger 18, the accumulator 25 and the compressor 22. In this cooling model the damper 45 is open (solid line), which allows the air to be in contact with the upstream heat exchanger 18.

Upon using the heating mode, the switching valve 46 is in its dotted line position, so that a closed flow of refrigerant is obtained in the following order, that is, the compressor 22, the downstream heat exchanger 19, the second pressure reducer 24 (the arrow H), the check valve 30b, the outside heat exchanger 21, the first electromagnetic valve 47 (the arrow H), the upstream heat exchanger 18, the accumulator 25, and the compressor 22. In this heating mode the damper 45 is closed (dotted line), which prevents the air from being in contact with the upstream heat exchanger 18, so that the air is passed through the by-pass passageway 2-3. As a result, an unnecessary heat exchange when using the heating mode in the upstream heat exchanger 18 does not occur.

Upon using the dehumidifying mode, the switching valve 46 is in its dotted line position, so that a closed flow of refrigerant is obtained in the following order, that is, the compressor 22, the downstream heat exchanger 19, the second electromagnetic valve 29 (the arrow D), the check valve 30b, the outside heat exchanger 21, the first pressure reducer (the arrow D), the upstream heat exchanger 18, the accumulator 25, and the compressor 22. In this dehumidifying mode, the damper 45 is open (solid line), which allows the air to be in contact with the upstream heat exchanger 18.

Figure 12:
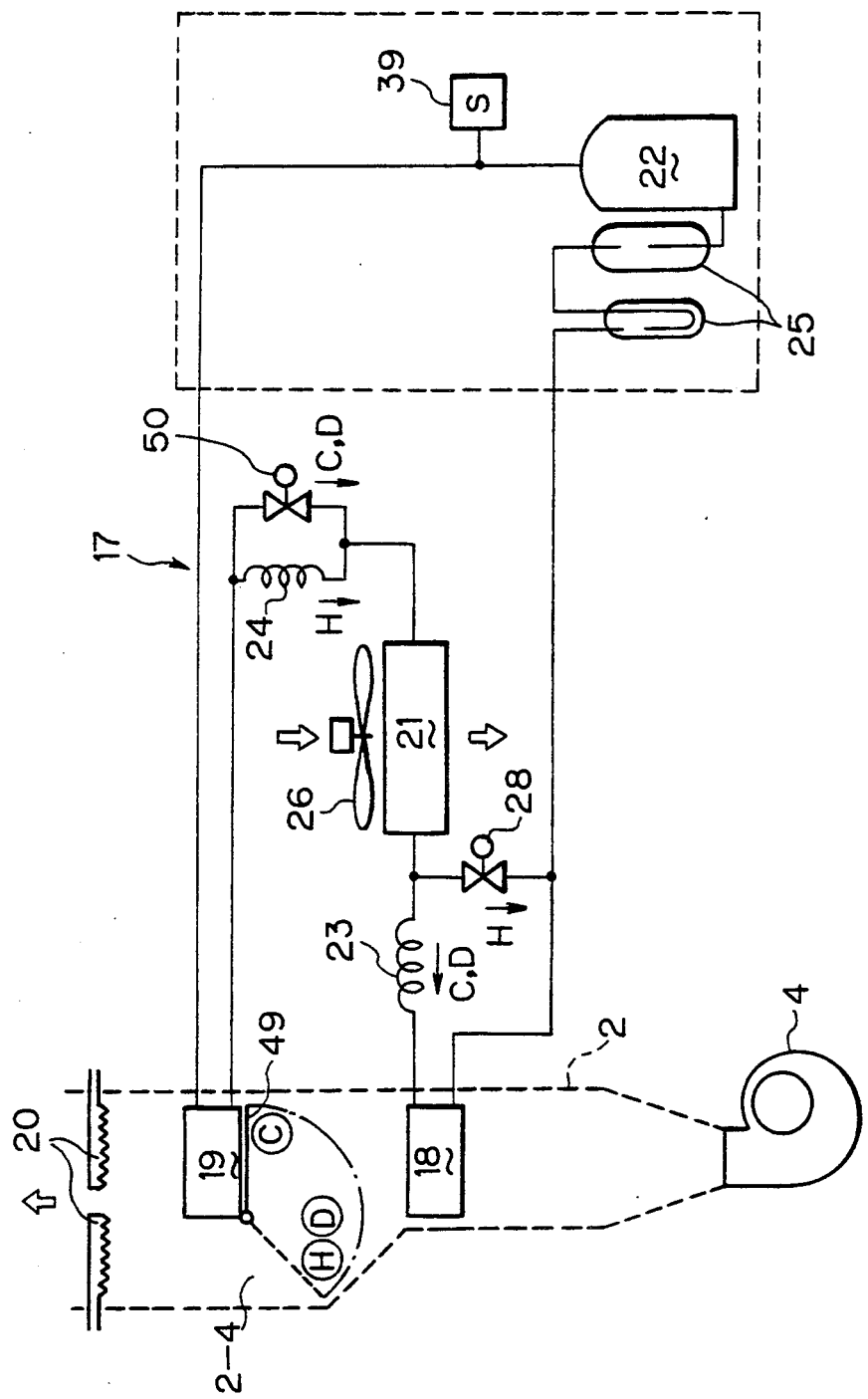

FIG. 12 shows a sixth embodiment, where a flow of the refrigerant in the downstream heat exchanger 19 is always obtained. Namely, the valve 27 is eliminated, and the compressor 22 is always connected to the downstream heat exchanger 19. A electromagnetic valve 50 is arranged parallel to the second pressure reducer 24, which is closed when in the heating mode and opened when in the cooling or dehumidifying mode C or D. In order to prevent a heat exchange from occurring, upon using a cooling mode, between the air flow and the downstream heat exchanger 19, a by-pass passageway 2-4 and a damper 49 are provided. The damper 49 is moved between a position as shown by a solid line to close the downstream heat exchanger 19 and obtain a flow of air via the by-pass passageway 2-4, and a position as shown by a dotted line to open the downstream heat exchanger 19 and obtain an air flow to contact the downstream heat exchanger 19.

The embodiment in FIG. 12 operates as follows. Upon using the cooling mode, the electromagnetic valve 50 is opened and the electromagnetic valve 28 is closed, so that a closed flow of refrigerant is obtained in the following order, that is, the compressor 22, the downstream heat exchanger 19, the electromagnetic valve 50 (arrow C), the outside heat exchanger 21, the first pressure reducer 23 (the arrow C), the upstream heat exchanger 18, the accumulator 25 and the compressor 22. In this cooling mode the damper 49 is closed (solid line), which allows the air to pass through the by-pass passageway 2-4, and prevents a heat exchange to take place between the air and the refrigerant at the downstream heat exchanger 19.

Upon use of the heating mode, the electromagnetic valve 28 is opened and the electromagnetic valve 50 is closed, so that a closed flow of refrigerant is obtained in the following order, that is, the compressor 22, the downstream heat exchanger 19, the second pressure reducer 24 (the arrow H), the outside heat exchanger 21, the first electromagnetic valve 28 (the arrow H), the accumulator 25, and the compressor 22. In this heating mode the damper 49 is open (dotted line), which prevents the air from being directed to the by-pass passageway 2-4, so that the air is in contact with the downstream heat exchanger 19 for heating the air.

Upon use of the dehumidifying mode, the electromagnetic valve 28 is closed and the electromagnetic valve 50 is opened, so that a closed flow of refrigerant is obtained in the following order, that is, the compressor 22, the upstream heat exchanger 19, the electromagnetic valve 50 (the arrow D), the outside heat exchanger 21, the first pressure reducer 23 (the arrow D), the upstream heat exchanger 18, the accumulator 25, and the compressor 22. In this dehumidifying mode the damper 49 is open (dotted line), which allows the air to come into contact with the downstream heat exchanger 19.

Figure 13:
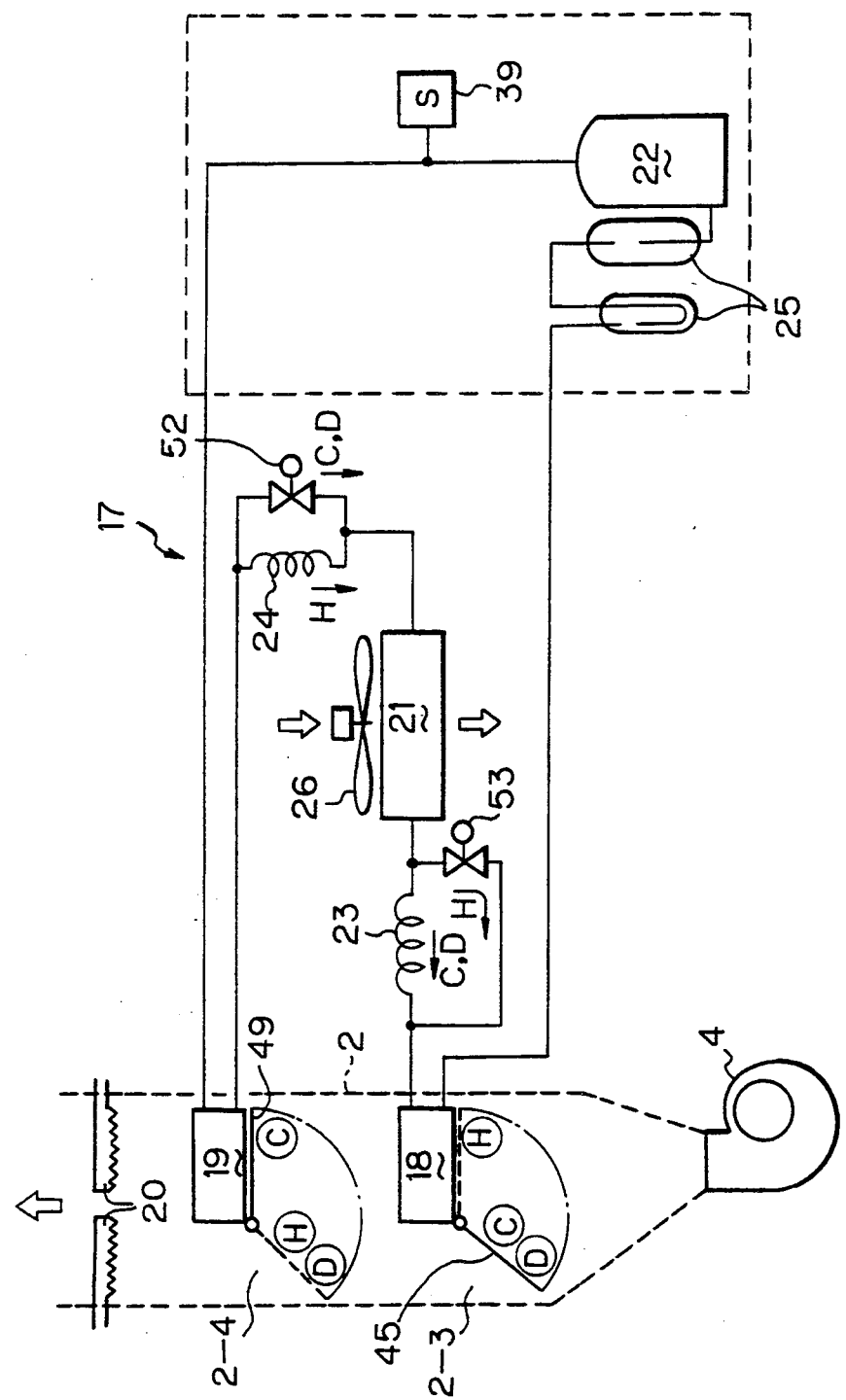

FIG. 13 shows a seventh embodiment, the refrigerant always passes through both the upstream and downstream heat exchangers 18 and 19 irrespective of the mode selected. An electromagnetic valve 53 is, similar to the electromagnetic valve 50 in the embodiment in FIG. 11, arranged parallel to the first pressure reducer 23 and arranged between the outside heat exchanger 21 and the upstream heat exchanger 18. An electromagnetic valve 52 is, similar to the valve 50 in FIG. 12, arranged parallel to the second pressure reducer 24. Furthermore, a damper 45 is provided for controlling the flow to the upstream heat exchanger 18, similar to the embodiment in FIG. 11, and a damper 49 is provided for controlling the flow of air into the downstream heat exchanger 19 in a manner similar to that in FIG. 12.

The embodiment in FIG. 13 operates as follows. Upon using the cooling mode, the electromagnetic valve 52 is opened and the electromagnetic valve 53 is closed, so that a closed flow of refrigerant is obtained in the following order, that is, the compressor 22, the downstream heat exchanger 19, the electromagnetic valve 52 (arrow C), the outside heat exchanger 21, the first pressure reducer 23 (the arrow C), the upstream heat exchanger 18, the accumulator 25 and the compressor 22. In this cooling mode, the damper 45 is opened as shown by a solid line thereby allowing the air to be directed to the upstream heat exchanger 18, and the damper 49 is closed (solid line), which allows the air to pass through the by-pass passageway 2-4, and prevents a heat exchange to take place between the air and the refrigerant at the downstream heat exchanger 19.

Upon use of the heating mode, the electromagnetic valve 53 is opened and the electromagnetic valve 52 is closed, so that a closed flow of refrigerant is obtained in the following order, that is, the compressor 22, the downstream heat exchanger 19, the second pressure reducer 24 (the arrow H), the upstream heat exchanger 21, the electromagnetic valve 53 (the arrow H), the upstream heat exchanger, the accumulator 25, and the compressor 22. In this heating mode, the damper 45 is closed as shown by a dotted line, thereby allowing the air to be directed to the by-pass passageway 2-3, and the damper 49 is open (dotted line), which allows the air to be directed into the downstream heat exchanger 19, so that heating of the air is done at the downstream heat exchanger.

Upon use of the dehumidifying mode, the electromagnetic valve 52 is opened and the electromagnetic valve 53 is closed, so that a closed flow of refrigerant is obtained in the following order, that is, the compressor 22, the upstream heat exchanger 19, the electromagnetic valve 52 (the arrow D), the outside heat exchanger 21, the first pressure reducer 23 (the arrow D), the upstream heat exchanger 18, the accumulator 25, and the compressor 22. In this dehumidifying mode, the damper 45 is open as shown by a solid line, thereby allowing the air to be directed to the upstream heat exchanger 18, and the damper 49 is open (dotted line), which allows the air to be directed into the downstream heat exchanger 19.

In the above embodiments, in order to vary the cooling ability at the outside fan 26, the rotation speed applied thereto is controlled. Alternatively, the outside heat exchanger 21 may be arranged at a location where a flow of the outside air is created, i.e., at a location where an air flow caused by the movement of the vehicle is created. A damper is provided for controlling the amount of air flow directed to the outside heat exchanger. A controller is provided for controlling the degree of the opening of the damper in accordance with the temperature of the refrigerant at the outlet 22-2 of the compressor, so that a desired cooling ability at the outside heat exchanger 21 is obtained.

In the embodiments as shown, the refrigerating cycle employs an accumulator. Alternatively, a receiver can be arranged in the refrigerating circuit.

It should further be noted that the numerical values used in the embodiments are to assist in the understanding of the invention, and therefore the present invention is, of course, not limited to such actual numerical values, and can suitably vary to obtain a desired effect.

In the above embodiment, the control of air temperature is effected by a manual operation of the control lever 38. However, it is also possible to provide an automatic system for controlling the temperature of the air as issued to a target value by controlling the capacity of the compressor 22, rotational speed of the fan, and the degree of the opening of the dampers, and the like.

In the embodiment, the upstream heat exchanger 18 is always used as an evaporator. However, it is conceivable to use the upstream heat exchanger as a condenser.

In the embodiment, the downstream heat exchanger 19 is always used as an condenser. However, it is conceivable to use the downstream heat exchanger as an evaporator.

In the embodiments, the air conditioning device is used for an automobile. However, the present invention can also be utilized for air conditioning houses or factories.

We claim:

1. An air conditioning system for a cabin to be air conditioned, comprising:
   a duct for introducing an air flow into the cabin;
   a blower for generating air flow in the duct;
   an upstream heat exchanger arranged in the duct for a heat exchange of a refrigerant with the air flow in the duct;
   a downstream heat exchanger arranged in the duct downstream of said upstream heat exchanger for a heat exchange of the refrigerant with the air flow in the duct;

an outside heat exchanger located to an outside of the duct for a heat exchange of the refrigerant with air outside of the cabin;

a pressure reduction device for reducing a pressure of the refrigerant;

a compressor for compressing the refrigerant;

a refrigerant container for storing an excessive amount of said refrigerant and for supplying a proper amount of said refrigerant to said compressor;

a refrigerant circuit for connecting the upstream heat exchanger, downstream heat exchanger, the outside heat exchanger, the pressure reducing device, the refrigerant container and the compressor, the refrigerant circuit having a dehumidifying mode wherein the compressed refrigerant from the compressor flows, in order, through the downstream heat exchanger, the outside heat exchanger, the pressure reduction device, the upstream heat exchanger, the refrigerant container, and the compressor;

means for varying the heat exchange between the refrigerant and the outside air at the outside heat exchanger;

means for detecting the temperature of the compressed refrigerant flowing from an outlet of the compressor before being heat exchanged; and means for variably controlling the heat exchange varying means to increase the heat exchange at the outside heat exchanger when the temperature of the refrigerant flowing from the compressor detected by the detecting means exceeds a predetermined value;

wherein said refrigerant container retains an amount of said refrigerant.

2. An air conditioning system according to claim 1, said refrigerant circuit having a cooling mode wherein the compressed refrigerant from the compressor flows, in order, through the outside heat exchanger, the pressure reducing device, and the upstream heat exchanger.

3. An air conditioning system according to claim 2, further comprising means for recovering a liquid state refrigerant from the downstream heat exchanger to the refrigerant container when said refrigerant circuit is in the cooling mode.

4. An air conditioning system for a cabin to be air conditioned, comprising:

a duct for introducing an air flow into the cabin;

a blower for generating the air flow in the duct;

an upstream heat exchanger arranged in the duct for a heat exchange of a refrigerant with the air flow in the duct;

a downstream heat exchanger arranged in the duct at a location downstream and in the direction of the air flow for a heat exchange of the refrigerant with the air in the duct;

an outside heat exchanger located outside of the duct for a heat exchange of the refrigerant with air outside of the cabin;

a pressure reduction device arranged for reducing a pressure of the refrigerant;

a container for storing an excessive amount of refrigerant;

a compressor for compressing the refrigerant;

a refrigerant circuit for connecting the upstream heat exchanger, downstream heat exchanger, the outside heat exchanger, the pressure reducing device, the refrigerant container and the compressor, the refrigerant circuit having a dehumidifying mode wherein the compressed refrigerant from the compressor flows, in order, along the downstream heat exchanger, the outside heat exchanger, the pressure reduction device, and the upstream heat exchanger;

means for varying the heat exchange ability between the refrigerant and the outside air at the outside heat exchanger;

means for detecting the temperature of the refrigerant from the compressor; and means for controlling the heat exchange ability varying means to increase the heat exchange ability at the outside heat exchanger when the temperature of the refrigerant from the compressor detected by the detecting means is increased to a predetermined value;

said refrigerant circuit having a heating mode wherein the compressed refrigerant from the compressor flows along, in order, the downstream heat exchanger, the pressure reducing device, and outside heat exchanger.

5. An air conditioning system for a cabin to be air conditioned, comprising:

a duct for introducing an air flow into the cabin;

a blower for generating the air flow in the duct;

an upstream heat exchanger arranged in the duct for a heat exchange of a refrigerant with the air flow in the duct;

a downstream heat exchanger arranged in the duct at a location downstream and in the direction of the air flow for a heat exchange of the refrigerant with the air in the duct;

an outside heat exchanger located outside of the duct for a heat exchange of the refrigerant with air outside of the cabin;

a pressure reduction device arranged for reducing a pressure of the refrigerant;

a container for storing an excessive amount of refrigerant;

a compressor for compressing the refrigerant;

a refrigerant circuit for connecting the upstream heat exchanger, downstream heat exchanger, the outside heat exchanger, the pressure reducing device, the refrigerant container and the compressor, the refrigerant circuit having a dehumidifying mode wherein the compressed refrigerant from the compressor flows, in order, along the downstream heat exchanger, the outside heat exchanger, the pressure reduction device, and the upstream heat exchanger;

means for varying the heat exchange ability between the refrigerant and the outside air at the outside heat exchanger;

means for detecting the temperature of the refrigerant from the compressor; and means for controlling the heat exchange ability varying means to increase the heat exchange ability at the outside heat exchanger when the temperature of the refrigerant from the compressor detected by the detecting means is increased to a predetermined value;

said upstream heat exchanger is arranged in the duct such that a by-pass passageway for the air is created, wherein it further comprises a damper for switching the flow of air between a first position where the air is directed to the by-pass passageway, and a second position where the air is directed to the upstream heat exchanger;

said refrigerant circuit is constructed such that, upon using the dehumidifying, cooling and heating modes, the refrigerant flows to the upstream heat exchanger; and said damper is, upon using the heating mode, operated to the first position, thereby preventing the air flow from being in contact with the upstream heat exchanger.

6. An air conditioning system for a cabin to be air conditioned, comprising:

a duct for introducing an air flow into the cabin;

a blower for generating the air flow in the duct;

an upstream heat exchanger arranged in the duct for a heat exchange of a refrigerant with the air flow in the duct;

a downstream heat exchanger arranged in the duct at a location downstream and in the direction of the air flow for a heat exchange of the refrigerant with the air in the duct;

an outside heat exchanger located outside of the duct for a heat exchange of the refrigerant with air outside of the cabin;

a pressure reduction device arranged for reducing a pressure of the refrigerant;

a container for storing an excessive amount of refrigerant;

a compressor for compressing the refrigerant;

a refrigerant circuit for connecting the upstream heat exchanger, downstream heat exchanger, the outside heat exchanger, the pressure reducing device, the refrigerant container and the compressor, the refrigerant circuit having a dehumidifying mode wherein the compressed refrigerant from the compressor flows, in order, along the downstream heat exchanger, the outside heat exchanger, the pressure reduction device, and the upstream heat exchanger;

means for varying the heat exchange ability between the refrigerant and the outside air at the outside heat exchanger;

means for detecting the temperature of the refrigerant from the compressor; and means for controlling the heat exchange ability varying means to increase the heat exchange ability at the outside heat exchanger when the temperature of the refrigerant from the compressor detected by the detecting means is increased to a predetermined value;

said downstream heat exchanger is arranged in the duct such that a by-pass passageway for the air is created, wherein it further comprises a damper for switching the flow of air between a first position where the air is directed to the by-pass passageway, and a second position where the air is directed to the downstream heat exchanger;

said refrigerant circuit is constructed such that, upon using the dehumidifying, cooling and heating modes, the refrigerant flows to the downstream heat exchanger; and said damper is, upon using the cooling mode, operated to the first position, thereby preventing the air flow from being in contact with downstream heat exchanger.

7. An air conditioning system for a cabin to be air condition, comprising:

a duct for introducing an air flow into the cabin;

a blower for generating the air flow in the duct;

an upstream heat exchanger arranged in the duct for a heat exchange of a refrigerant with the air flow in the duct;

a downstream heat exchanger arranged in the duct at a location downstream and in the direction of the air flow for a heat exchange of the refrigerant with the air in the duct;

an outside heat exchanger located outside of the duct for a heat exchange of the refrigerant with air outside of the cabin;

a pressure reduction device arranged for reducing a pressure of the refrigerant;

a container for storing an excessive amount of refrigerant;

a compressor for compressing the refrigerant;

a refrigerant circuit for connecting the upstream heat exchanger, downstream heat exchanger, the outside heat exchanger, the pressure reducing device, the refrigerant container and the compressor, the refrigerant circuit having a dehumidifying mode wherein the compressed refrigerant from the compressor flows, in order, along the downstream heat exchanger, the outside heat exchanger, the pressure reduction device, and the upstream heat exchanger;

means for varying the heat exchange ability between the refrigerant and the outside air at the outside heat exchanger;

means for detecting the temperature of the refrigerant from the compressor; and means for controlling the heat exchange ability varying means to increase the heat exchange ability at the outside heat exchanger when the temperature of the refrigerant from the compressor detected by the detecting means is increased to a predetermined value;

said upstream heat exchanger is arranged in the duct such that a first by-pass passageway for the air is created;

said downstream heat exchanger is arranged in the duct such that a second by-pass passageway for the air is created, wherein it further comprises a first damper for switching the flow of air between a first position where the air is directed to the first by-pass passageway, and a second position where the air is directed to the upstream heat exchange, and a second damper for switching the flow of air between a third position where the air is directed to the second by-pass passageway, and a fourth position where the air is directed to the downstream heat exchanger;

said refrigerant circuit is constructed such that, upon using the dehumidifying, cooling and heating modes, the refrigerant flows to the upstream heat exchanger and the downstream heat exchanger; and said first damper is, upon using the heating mode, operated to the first position, thereby preventing the air flow from being in contact with the upstream heat exchanger, and second damper is, upon using the cooling mode, operated to the third position, thereby preventing the air flow from being in contact with the downstream heat exchanger.

8. An air conditioning system for a cabin to be air conditioned, comprising:

a duct for introducing an air flow into the cabin;

a blower for generating the air flow in the duct;

an upstream heat exchanger arranged in the duct for a heat exchange of a refrigerant with the air flow in the duct;

a downstream heat exchanger arranged in the duct at a location downstream and in the direction of the air flow for a heat exchange of the refrigerant with the air in the duct;

an outside heat exchanger located outside of the duct for a heat exchange of the refrigerant with air outside of the cabin;

a pressure reduction device arranged for reducing a pressure of the refrigerant;

a container for storing an excessive amount of refrigerant;

a compressor for compressing the refrigerant;

a refrigerant circuit for connecting the upstream heat exchanger, downstream heat exchanger, the outside heat exchanger, the pressure reducing device, the refrigerant container and the compressor, the refrigerant circuit having a dehumidifying mode wherein the compressed refrigerant from the compressor flows, in order, along the downstream heat exchanger, the outside heat exchanger, the pressure reduction device, and the upstream heat exchanger;

means for varying the heat exchange ability between the refrigerant and the outside air at the outside heat exchanger;

means for detecting the temperature of the refrigerant from the compressor; and means for controlling the heat exchange ability varying means to increase the heat exchange ability at the outside heat exchanger when the temperature of the refrigerant from the compressor detected by the detecting means is increased to a predetermined value;

said means for varying the heat exchange ability comprises an outside fan for controlling the amount of outside air in contact with the outside heat exchanger.

9. An air conditioning system for a cabin to be air conditioned, comprising:

a duct for introducing an air flow into the cabin;

a blower for generating air flow in the duct;

an upstream heat exchanger arranged in the duct for a heat exchange of a refrigerant with the air flow in the duct;

a downstream heat exchanger arranged in the duct downstream of said upstream heat exchanger for a heat exchange of the refrigerant with the air flow in the duct;

an outside heat exchanger located to an outside of the duct for a heat exchange of the refrigerant with air outside of the cabin;

a pressure reduction device for reducing a pressure of the refrigerant;

a compressor for compressing the refrigerant;

a refrigerant container for storing an excessive amount of said refrigerant and for supplying a proper amount of said refrigerant to said compressor;

a refrigerant circuit for connecting the upstream heat exchanger, downstream heat exchanger, the outside heat exchanger, the pressure reducing device, the refrigerant container and the compressor, the refrigerant circuit having a dehumidifying mode wherein the compressed refrigerant from the compressor flows, in order, through the downstream heat exchanger, the outside heat exchanger, the pressure reduction device, the upstream heat exchanger, the refrigerant container, and the compressor;

means for varying the heat exchange between the refrigerant and the outside air at the outside heat exchanger;

means for detecting the temperature of the compressed refrigerant flowing from an outlet of the compressor immediately downstream of the compressor; and means for variably controlling the heat exchange varying means to increase the heat exchange at the outside heat exchanger when the temperature of the refrigerant flowing from the compressor detected by the detecting means exceeds a predetermined value;

wherein said refrigerant container retains an amount of said refrigerant.

* * * * *